Sept. 30, 1930.  E. WILDHABER  1,777,023
ROTARY ENGINE
Filed April 6, 1927  2 Sheets-Sheet 1
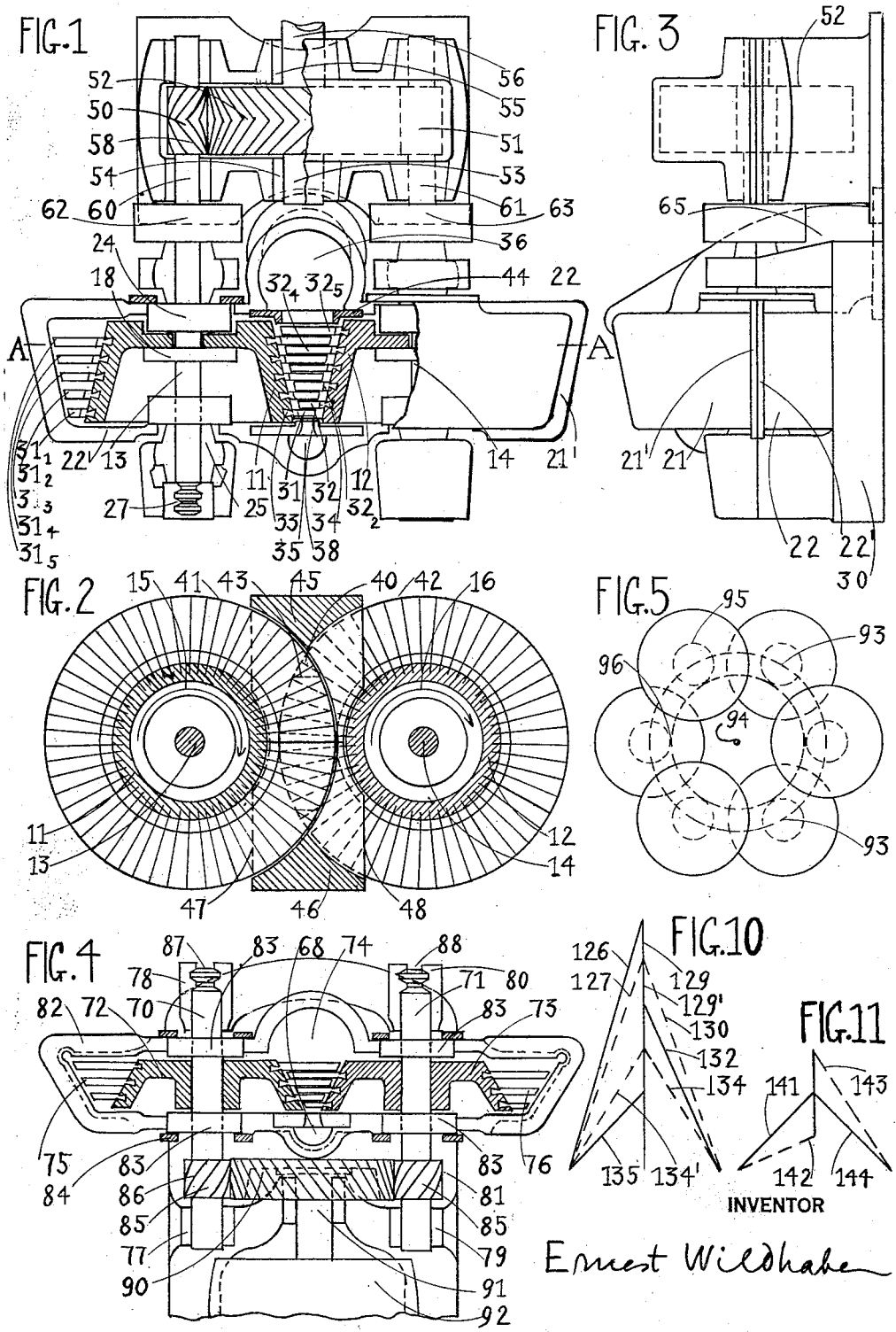
INVENTOR
Ernest Wildhaber

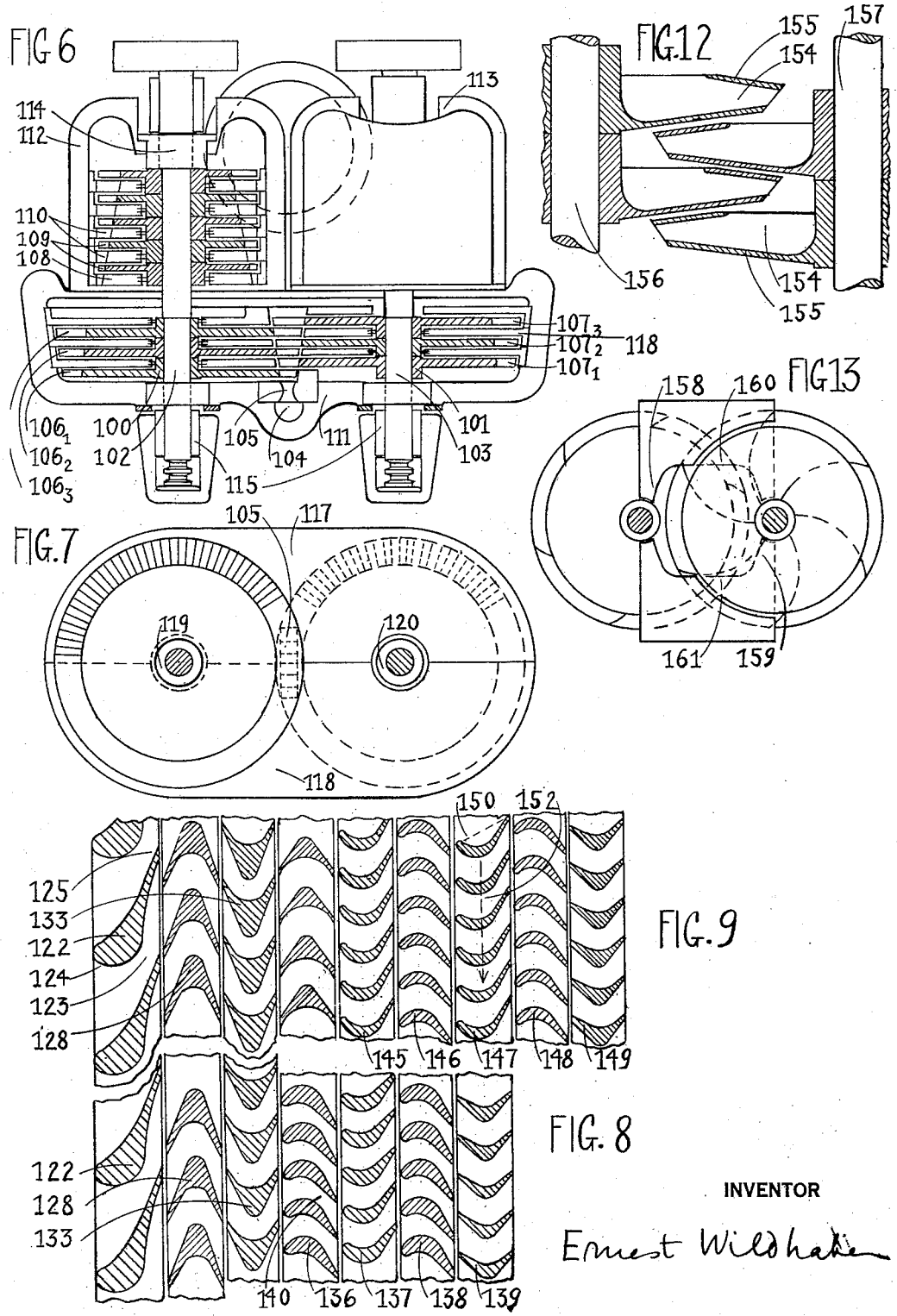

Patented Sept. 30, 1930

1,777,023

UNITED STATES PATENT OFFICE

ERNEST WILDHABER, OF BROOKLYN, NEW YORK

ROTARY ENGINE

Application filed April 6, 1927. Serial No. 181,388.

The present invention relates to rotary engines, and especially to turbines using a compressible medium, such as for instance steam or combustion gases.

One purpose of the present invention is to devise a novel and efficient arrangement of geared turbines. Another object is to provide a turbine having a plurality of rotors mounted on parallel axes and containing a minimum internal resistance. A further object is to provide a turbine having a plurality of rotors mounted on parallel axes and provided with velocity stages, in which no stationary blades are provided intermediate the movable blades. Velocity stages, sometimes called Curtis stages, are known to contain a plurality of rings of blades movable in unison with each other and utilizing the kinetic energy of the medium while maintaining the pressure of the medium the same before and after it passes through said plurality of rings of blades. In standard practice, stationary blades are disposed intermediate adjacent rings of movable blades. The said stationary blades are known to consume much energy and to reduce the efficiency of the velocity stages. An object of the present invention is to do away with these latter losses and to raise the efficiency of velocity stages to a much higher level, by providing movable blades only, adjacent rows of blades moving in opposite directions.

Other objects will be apparent in the specification and from reciting the appended claims.

My invention is illustrated by way of examples in the accompanying drawings, in which Fig. 1 is a somewhat simplified plan view of a geared steam turbine constructed in accordance with the present invention, with part of the upper cover removed and showing the rotors partly in axial section.

Fig. 2 is a sectional view of the rotors, the section being taken along lines A—A of Fig. 1.

Fig. 3 is a side view of the geared steam turbine shown in Fig. 1.

Fig. 4 is a schematic plan view of another form of steam—or gas turbine constructed according to the present invention, with the upper cover removed and showing the rotors in axial section.

Fig. 5 is a diagram explaining the preferred arrangement when more than two rotors are provided.

Fig. 6 is a diagrammatic plan view, partly a section, of another form of steam turbine constructed according to the present invention.

Fig. 7 is a front view of a pair of wheels containing blades, and forming part of the rotors shown in Fig. 6, and of intermediate stationary parts, the wheel at the right being back of the wheel at the left and nonadjacent to it, for convenience in showing the said intermediate parts.

Fig. 8 is a developed section in circumferential direction through a number of rings of rotary blades, as may be used in accordance with the present invention.

Fig. 9 is a developed section through rotary blades, similar to Fig. 8, showing however a modified arrangement.

Fig. 10 and Fig. 11 are velocity diagrams for explaining the inclinations of the blades shown in Fig. 8 and Fig. 9.

Fig. 12 is a partial section taken along the axes of a pair of rotors constructed according to a modification of my invention.

Fig. 13 is a view in axial direction of the rotors shown in Fig. 12, and of intermediate stationary parts, at half the scale of Fig. 12.

In the Figures 1, 2 and 3, the characters 11 and 12 denote two rotors in the form of drums, which are rotatable on parallel axes 13, 14, in the same direction of revolution, as indicated by arrows 15, 16 in Fig. 2. The rotors are secured to flanges 18, of the shafts or axes 13, 14, by any suitable means, such as screw bolts, not further indicated in the drawing. The rotors extend in a casing consisting of two parts 21, 22, which may be tightly bolted together with flanges 21', 22'. The shafts 13, 14 project out of the casing 21, 22 on either side, and pass stuffing boxes 24 of known structure, indicated by their general outline. The shafts 13, 14 are journalled in a pair of bearings 25, and on one side contain circular grooves 27, engaging a thrust bearing. The casing as well as the bearings rest on a base 30, as outlined in Fig. 3.

The rotors 11 and 12 contain blades 31, 32 arranged in rings $31_1$, $31_2$, $31_3$, $31_4$, $31_5$ and $32_1$, $32_2$, $32_3$, $32_4$, $32_5$ of such diameter that they overlap. The overlap is seen especially in Fig. 2. Usually the blades are pieces separate from the rotor drums and are rigidly secured to them by known means such as slots 33, 34 of dove tail form or other suitable form. The blades themselves as well as the manner of securing them to the rotors are the same as in usual practice. It is understood that the blades may also be made one piece with the rotor drums, if so desired.

A medium, such as steam, or combustion gases, is led to the blades at 35, which is a point where the rotors overlap. The medium then passes gradually through the blades from the high pressure side 35 to the low pressure side 36, high pressure side being the side of larger pressure, although the pressure in some cases may not be actually high, for instance in exhaust turbines constructed according to the present invention.

The medium passes first through the stationary nozzles 38, and then through the ring $31_1$ of blades of rotor 11, through the ring $32_1$ of blades of rotor 12, and continues to pass through the rings $31_2$, $32_2$, $31_3$, $32_3$, $31_4$, $32_4$, $31_5$, $32_5$, which rings belong alternately to the two rotors.

The medium passes therefore through the rings not on their whole, but only on part of the circumference, namely on the part, where adjacent rings of the different rotors overlap.

Moreover it is frequently desirable to not fully utilize the whole area of overlap, but to leave out the corners 40, (Fig. 2) where the two outside circles 41, 42 intersect. The flowing medium will then occupy an area between the dotted lines 43 and between the overlapping circles 41, 42.

The flow of the medium can be controlled by various means, such as by suitably placing the initial nozzles 38, to cover only part of the overlap if so desired, and by providing a member 44 after a ring of blades, especially after the last ring of blades $32_5$. Member 44 has an opening or window, which ends along the dotted lines 43 (Fig. 2), and which therefore prevents the medium from passing through the extreme corners already referred to.

In addition stationary members 45, 46 (Fig. 2) are provided, which extend inside of the rectangle formed by the parallel lines 47 and 48, (or which may be made to extend all around the rotors) and which occupy the space on the outside of each ring of blades, thereby preventing the medium from flowing outside of the rings of blades.

Rotary engines constructed according to the present invention belong to the multiple rotor group already referred to, and form a novel type of this group.

One important advantage of this group lies in the reduced number of stages required, inasmuch as rotating blades are substituted for stationary blades of the single rotor type, so that energy is transmitted to two rings of blades per stage instead of only to one.

A further important feature lies in the high efficiency attainable, inasmuch as the internal friction losses are confined to such blades which transmit energy.

Another prominent feature lies in the fact that the outlet energy can be fully utilized. The kinetic energy of the medium leaving one ring of rotating blades may be fully recovered in the subsequent ring of blades. This feature permits to further reduce the number of stages, as will be fully explained hereafter.

All these advantages are maintained in rotary engines constructed according to the present invention. But whereas in the known engines of the multiple rotor group these advantages are bought with complications in the further design, the further design and the general arrangement are utterly simple in the present case.

It is evident from Fig. 2, that opposite peripheral velocities of the blades result in an equal direction of revolution, as indicated by the arrows 15, 16. The rotors may therefore be provided with pinions 50, 51 meshing with the same gear 52. Shaft 53 of gear 52 is shown in the plane constituted by the two axes 13, 14. Shaft 53 is rotatably held in two bearings 54, 55 and delivers energy on the side 56 in a manner not further indicated. Gear and pinions may be provided with herringbone teeth 58, as indicated.

The pinions are integral with their shafts 60, 61 and coaxial with the shafts or axes 13, 14 of the rotors. The pinions are driven from shafts 13, 14 by means of clutches 62, 63 of known design, indicated merely as rectangles. Especially in the case of more than two rotors, as outlined hereafter, the clutches are so designed as to permit engagement and disengagement while the turbine is running.

The exhaust of the turbine is received at 36, and is led away through an exhaust pipe 65, in the case of steam turbines preferably to a condensor.

It is noted that shaft 53 is centrally located with respect to the turbine, whereas even in known single rotor turbines this shaft is offset. Moreover gear 52 can be made smaller than a gear of the same capacity in a single rotor turbine, because the load is distributed to two pinions instead of only to one.

For simplicity's sake I have omitted in the drawings most of those known parts which go with engines of the kind referred to without further explanation, especially valves, a centrifugal governor, a lubrication system.

If the turbine is intended to be a gas turbine, operated by hot combustion gases instead of steam, I further provide means for cooling the rotating blades, preferably with air, in addition to what is indicated in the drawings. The principles which may be used for cooling the blades are explained in detail in my copending application entitled "Turbine", filed March 11, 1927, Serial No. 174,518.

Fig. 4 illustrates somewhat diagrammatically another form of turbine constructed according to the present invention, and intended especially for smaller capacities.

The medium, such as steam, is introduced at 68, and flows in a general direction parallel to the axes 70, 71 of the rotors 72, 73 to the side 74 of lower pressure. The rotors contain each three rings 75, 76 of blades, which overlap each other.

The parallel shafts 70, 71 of the two rotors are journalled in bearings 77, 78, 79, 80, placed on a common frame 81. The turbine housing 82 also stands on this frame. It is again composed of two parts, which in operation are tightly bolted together, and of which the upper part or cover has been removed in the drawing. Before leaving the casing, the shafts 70, 71 pass on either side through stuffing boxes 83 indicated diagrammatically by rectangles. The stuffing boxes are tightly secured to the casing by means such as rings 84, bolted to the casing and to the stuffing boxes.

Intermediate the two bearings 77, 78 and 79, 80 respectively and on the side of higher pressure, pinions 85, 85′ are provided, which are coaxial with and frequently also integral with the shafts 70, 71. The pinions 85, 85′ contain helical teeth 86 of such hand, that the thrust resulting from the tooth pressure is in a direction opposite to the thrust exerted on the rotors by the medium. In this manner the thrust bearings 87, 88 are called upon to carry only a reduced load.

The pinions mesh with the same helical gear 90, rigidly secured to a shaft 91 of any suitable machine, such as for instance an electric generator 92 indicated only with part of its outline.

It is noted, that the energy is here transmitted on the side of higher pressure, whereas the known turbines transmit the energy on the side of lower pressure. By providing an arrangement as shown, the length of the unit may be reduced.

An arrangement of a turbine with more than two rotors is diagrammatically outlined in Fig. 5, in which 93 denote the centers of six rotors. They are arranged at equal distances from a central axis 94, and contain pinions 95 meshing with the same gear 96 rotatable on axis 94. The pinions receive the drive from their rotors through clutches, such as indicated at 62, 63 in Fig. 1. A multiple rotor arrangement as indicated permits a high efficiency within a very great range of loads. At small loads the inlet of a number of rotors is shut off, the clutches of said rotors are disengaged, and these rotors are stopped. They cease therefore to consume energy through internal friction.

A further novel application is illustrated in Fig. 6. The turbine outlined in Fig. 6 is a combination of the new type just described with a known type. Two rotors 100, 101 are rotatable on parallel axes 102, 103 in the same direction of revolution. They contain on the high pressure side blades arranged in rings of such diameter, that they overlap, as described with reference to Figs. 1—4. They also contain blades arranged in rings of a diameter smaller than the distances of the two axes 102, 103, of known design, be it of the action type or of the reaction type.

The medium of such as steam, is introduced at a point 104 where the rings of blades overlap. It passes first through stationary nozzles 105, and then alternately through rings of blades of the two rotors, namely through rings $106_1$, $107_1$, $106_2$, $107_2$, $106_3$, $107_3$. So far the flow of medium occupies only part of the circumference of the rings of blades, namely the area of overlap, or part of such area. After having passed through the overlapping rings, the medium passes through a rotor in a known manner, and preferably on the whole circumference. It passes through stationary blades or channels 108, and then alternately through rotating blades 109 and stationary blades 110.

The casing in front may be made of an upper and a lower part, the two rotors being covered by the same casing 111. In the rear preferably separate casings 112, 113 are used on the two rotors. Before leaving the casing, the shafts 102, 103 pass through stuffing boxes 114. The shafts are supported on bearings 115. The reduction gears are omitted in this figure.

Fig. 7 is a view of the rotors shown in Fig. 6 and the stationary parts 117, 118, which prevent the medium from flowing outside of the blades. The initial nozzles 105 are indicated in dotted lines. Every ring of blades, in which a pressure drop takes place, may be secured to a separate disk, so that the stationary members 117, 118, intermediate the disks, extend inwardly as far as the hubs 119, 120 of said disks. Separate disks may be used especially, when the drop in pressure is large in the individual rings of blades.

It is desirable in steam turbine practice, to let the steam expand at the start to a fraction of its initial pressure. The kinetic energy of the expanded steam is in known practice frequently utilized in so-called Curtis stages, that is to say the high velocity of the steam is not completely used up in a single ring of rotating blades, but in a plurality of rings, stationary blades for reversing the steam being placed between two subsequent rotating rings. In this known case the pressure of the steam is the same immediately before entering the first and after leaving the last ring of a plurality of rotating rings of blades.

Turbines constructed according to the present invention can utilize a similar arrangement with particular advantage, because they eliminate its main drawback of low efficiency. I therefore preferably use on the high pressure side two or more of such stages, so that the pressure of the medium is substantially the same before and after two or more subsequent rings of blades; such as before ring $106_1$ and after ring $107_1$ (Fig. 6), or before ring $106_1$ and after ring $106_2$.

I may use this type of stages exclusively on the high pressure side, where the different rings of blades overlap, or I may combine such stages with stages of the reaction type.

Such a combination of stages is indicated in Fig. 8, another in Fig. 9, and Fig. 10 and Fig. 11 are explanatory velocity diagrams.

122 denotes stationary channels or nozzles having a minimum area 123 intermediate the ends 124, 125. They will therefore permit the medium to assume a velocity, at end 125, in excess of the velocity of sound, as well known. In Fig. 10, the velocities are plotted as straight lines, whose linear distances are proportional to the velocities and whose directions are parallel to the direction of the velocities. Absolute velocities are drawn in full lines, and relative velocities of the medium with respect to the rotating blades are shown in dotted lines.

After having passed through and expanded in the nozzles 122, the medium assumes a velocity such as 126 (Fig. 10). The velocity 127 of the medium relatively to the rotating blades 128 may then be determined by plotting the peripheral velocity 129 of blades 128 in Fig. 10, as indicated and completing the triangle 126, 127, 129. Preferably the blades 128 have the same inclination on the entering side as relative velocity 127, as known. The medium leaves the blades 128 with an equal, but oppositely directed relative velocity, indicated at 130 in Fig. 10, no relative acceleration taking place in the rotating blades 128. The absolute velocity 132 of the medium, after leaving blades 128, may be determined by plotting the peripheral velocity at 129', and by completing triangle 130, 132, 129'. The medium now enters the blades 133 rotating in opposite direction. The relative velocity 134 may be determined as before, see Fig. 10. The relative velocity 134' of the medium, when leaving the blades 133 is equal to but oppositely directed as compared with the relative velocity 134 when entering. Neither in the blades 128, nor in the blades 133 does the medium experience an acceleration relatively to the blades. The pressure of the medium when entering blades 128 and when leaving blades 133 is therefore the same. The absolute velocity has changed from an amount 126 to an amount 135, the latter being determined in the manner explained.

In the example indicated in Fig. 8, I have shown rotating blades 136, 137, 138, 139, of different type disposed after the blades 128, 133. In these blades the medium assumes a larger relative velocity when leaving the blades than when entering. A drop in the pressure of the medium therefore takes place in the rotating blades. Blades of this type have frequently been called reaction blades. When it is desired to have a particularly small number of stages, I may provide blades 136, 137, 138 which form channels having a minimum area 140 intermediate the two ends, so that the medium may assume a velocity beyond the velocity of sound. A velocity diagram corresponding to such blades as 136, 137, 138 is shown in Fig. 11.

The absolute velocity of the medium when entering blades 136, is denoted by character 141. The relative velocity 142 may be determined in the same manner as explained before. The relative velocity 143 of the medium when leaving blades 136 may be determined in known manner from the area of the channels and from the changed density or specific gravity of the medium. The absolute velocity is then 144. Equal or similar velocities may be provided in the blades 137, 138. The last ring of blades is preferably so designed, that the absolute velocity of the medium, on the leaving side, is a minimum and directed substantially parallel to the axes of rotation.

The kinetic energy of the medium which corresponds to the said absolute velocity is namely lost, whereas the kinetic energy of the medium, which corresponds to an absolute velocity 144, may be recovered in the subsequent ring of blades. In all rings of blades but the last one, large leaving velocities may therefore be provided, which feature permits to further reduce the number of stages as compared with the single rotor type of turbines.

In Fig. 9 blades are shown arranged in a larger number of rings or stages as compared with Fig. 8. The blades 145, 146, 147, 148, 149 are inclined in their general direction 150 to the direction 152 of peripheral motion, as are the blades 136—139, but they do not contain a minimum area intermediate their ends. In other words they are designed for relative velocities of the medium not in excess of the velocity of sound.

The Figs. 12 and 13 diagrammatically illustrate an embodiment of the present invention, in which the flow of the medium extends in axial direction only on the whole, and extends radially in the individual stages. If applied to pumps, the medium preferably flows outwardly in the individual stages, as is usual in centrifugal pumps. The medium flows inside of the area constituted by the circles 158, 159 and the lines 160, 161. After moving outwardly in one rotor, it passes to a point near the hub of the other rotor, and then again starts to move outwardly on said rotor. The arrangement of the various stages of the rotors is evident from Fig. 12, which is a section in a larger scale, through the two axes of the rotors. The medium passes alternately from a stage of one rotor to the subsequent stage of the other. The rotating blades 154 are secured to or part of bodies 155, which are rotatable either on axis 156, or on axis 157.

It is understood that such changes and further modifications may be made in my invention, as fall within the limits of the appended claims.

What I claim is:

1. In a geared turbine using a compressible medium, a rotor, blades provided on said rotor adjacent its periphery, two bearings for rotatably holding said rotor, means for guiding said medium through said blades from a side of higher pressure to a side of lower pressure, a pinion forming part of said rotor and disposed between said two bearings on the side of higher pressure, a gear meshing with said pinion, and stuffing boxes disposed adjacent said rotor, one of said stuffing boxes being disposed between said pinion and said blades.

2. A geared turbine using a compressible medium, having two rotors rotatable on parallel axes, said rotors containing blades arranged in a plurality of rings of such diameter that they overlap, each rotor being disposed between two bearings, means for guiding a medium to said blades at a point where they overlap, a pinion arranged coaxially with each rotor between said two bearings, a stuffing box disposed between said pinion and said blades, and a gear meshing with both of said two pinions.

3. In a geared turbine using a compressible medium, a rotor, blades provided on said rotor adjacent its periphery, two bearings for rotatably holding said rotor, means for guiding said medium through said blades from a side of higher pressure to a side of lower pressure, a pinion forming part of said rotor and disposed between said two bearings, a gear meshing with said pinion, and stuffing boxes disposed adjacent said rotor, one of said stuffing boxes being disposed between said pinion and said blades.

4. In a turbine using a compressible medium, two rotors rotatable on parallel axes, said rotors containing blades arranged in rings of such diameter that they overlap, stationary nozzles disposed adjacent a point of overlap for converting pressure energy of the medium into kinetic energy, the blades of a plurality of rings of one rotor and of at least one ring of the other rotor being shaped to successively utilize the kinetic energy created in said nozzles while maintaining the pressure of the medium the same before and after it passes through all the last named rings of said two rotors.

ERNEST WILDHABER.